Jan. 14, 1930.  R. T. SMITH  1,743,693
AUTOMOBILE LICENSE HOLDER
Filed Sept. 6, 1927

Richard T. Smith
INVENTOR.
BY C. E. Harpman
ATTORNEY.

Patented Jan. 14, 1930

1,743,693

UNITED STATES PATENT OFFICE

RICHARD T. SMITH, OF AKRON, OHIO

AUTOMOBILE LICENSE HOLDER

Application filed September 6, 1927. Serial No. 217,820.

This invention relates to means for securing license plates or tags to vehicles and its principal object is to provide a simple, durable and efficient device whereby the license plates may be quickly and easily attached or removed and at the same time are securely held against accidental displacement or loss. A further object is to eliminate the unpleasant noises so common in the ordinary fasteners due to the fact that they become loose under the constant vibration of the vehicle.

My invention is fully described in the following specifications and shown in the accompanying drawing in which Figure 1 is a front elevation of the device showing the fasteners in position.

Figure 1:
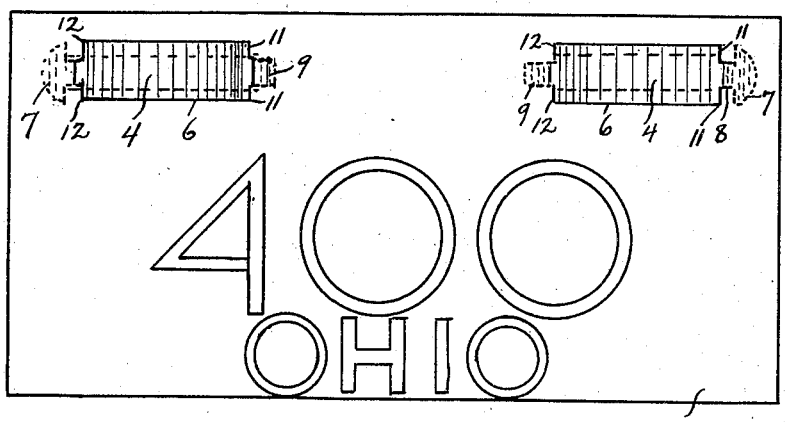
Figure 2:
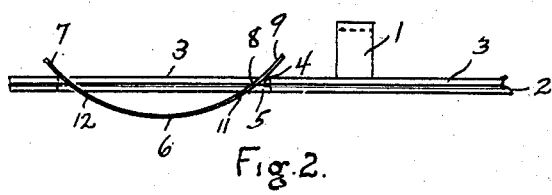
Figure 2 is a top plan view showing a fastener in position.
Figure 3:
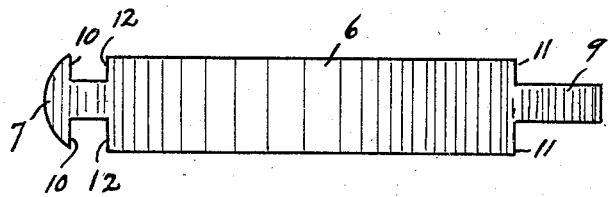
Figure 3 is a top plan view of the fastener.

Referring now to the drawing, 1 indicates a bracket such as is ordinarily provided at some part of the vehicle for the reception and support of a license plate 2. The bracket 1 includes a long arm 3 which is provided with longitudinal slots 4, and the license plate 2 is provided near its upper edge with similar longitudinal slots 5 which register approximately with the slots in the bracket.

The usual method of attachment is by means of thread bolts which are passed through the slots in the license plate and bracket and secured by ordinary nuts. There are several objections to the above method, the most common of which are, first, the bolts become rusted due to exposure to weather and often have to be cut off when it becomes necessary to remove the tag; and, second, the nuts often become loose causing unpleasant noises and not infrequently work entirely off resulting in loss of the license plate which necessitates unnecessary expense and inconvenience.

By my invention I provide a device which cooperates with the same slots above described and which can be attached by any person in a few seconds and which cannot become loose.

My device comprises a flat, curved metal spring 6. From each side at one end of this flat, curved metal spring 6 rectangular notches are cut so as to leave the ends with a head portion 7, and separated from the flat, curved metal spring 6 by the neck portion 8. The opposite end of the flat curved metal spring 6 is provided with a relatively narrow extension 9.

The operation of the device is as follows:

The license plate 2 is held by one hand of the operator against the bracket 1 so that the slots are brought into register. Holding the flat, curved metal spring 6 in a substantially vertical position with his other hand the operator passes the head portion 7 through the slots at one end of the license plate and bracket. The flat, curved metal spring 6 is then rotated so that shoulders 10 project out beyond the longitudinal slot 4. The flat, curved metal spring is now sprung in and lowered so that the relatively narrow extension 9 will pass through an opposite end of the longitudinal slots 4 and 5. The operator now releases the flat, curved metal spring 6 and the license plate 2 is held under tension to the long arm 3 of the bracket 1. It is now obvious that shoulders 11 and 12 will now be forced against the license plate 2 holding the license plate 2 in a secure manner.

Thus it will be seen that I provide an extremely simple and efficient device which may be quickly attached and detached and which is absolutely secure against accidental displacement, thereby eliminating the great disadvantage of the present method.

What I claim is:

1. In a device for securing license plates of an automobile to a license bracket carried on said automobile, a single flat curved metal spring slightly longer than a slot of the bracket and plate and adapted to have both ends inserted in the same slot, a head portion formed at one end of said flat curved metal spring, and a relatively narrow extension formed on the other end of said flat curved metal spring for the purpose of passing through the slot in a license plate and through the slot in a bracket, substantially as described.

2. In a device of the class described, the combination of a bracket member provided with a slot, and a flat curved metal spring slightly longer than the slot of the bracket and a slot in a license plate and adapted to have both ends inserted in the same slot, a head portion formed at one end of said flat curved metal spring, shoulders formed on the inner edge of said head portion, shoulders oppositely disposed from said shoulders on the head, a relatively narrow extension at the other end of said flat curved metal spring, and shoulders formed at the base of said relatively narrow extension end, substantially as described.

In testimony whereof I affix my signature.

RICHARD T. SMITH.